May 20, 1930.  B. DICK ET AL  1,759,224

METHOD OF ATTACHMENT OF HOSE FITTINGS

Filed April 22, 1929

Inventors
Burns Dick
Albert Brunner
By E. E. Huffman
Att'y.

Patented May 20, 1930

1,759,224

UNITED STATES PATENT OFFICE

BURNS DICK AND ALBERT BRUNNER, OF ST. LOUIS, MISSOURI, ASSIGNORS TO WAGNER ELECTRIC CORPORATION, OF ST. LOUIS, MISSOURI, A CORPORATION OF DELAWARE

METHOD OF ATTACHMENT OF HOSE FITTINGS

Application filed April 22, 1929. Serial No. 356,913.

Our invention relates to the application to hose of fittings to constitute parts of coupling devices, such for example, as employed in the lines of fluid-operated braking apparatus.
Recent improvement in hose manufacture has made it possible and desirable to employ flexible hose in such apparatus which is of very small bore and our invention comprises a method for conveniently and satisfactorily securing connecting fittings to such small bore hose.

Figure 3:
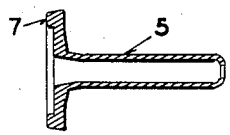
Figure 1:
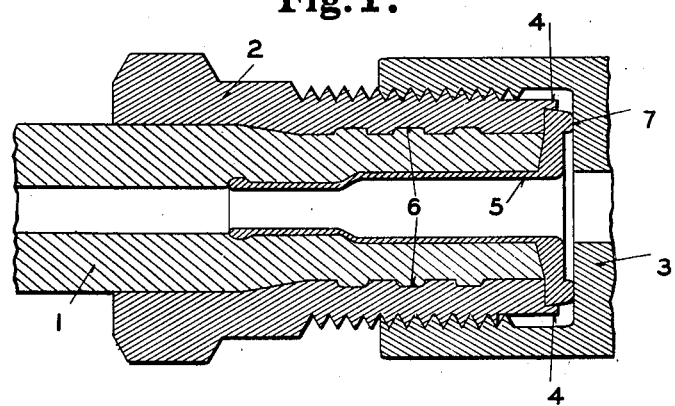
Figure 4:
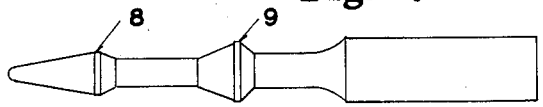
Figure 2:
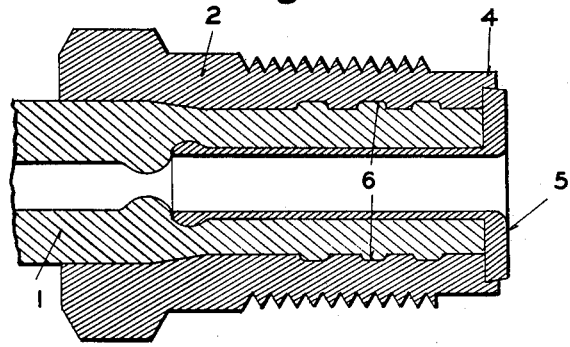

In the accompanying drawings Figure 1 is a cross-sectional view illustrating a hose fitting applied to a hose by means of our improved method and also showing a portion of a line connector with which it cooperates; Figure 2 illustrates difficulties which our improved method is intended to overcome; Figure 3 illustrates a hose nipple in the form in which it is originally applied to the hose; and Figure 4 illustrates an expanding punch which is employed to change the size and conformation of the nipple of Figure 3 to correspond to that shown in Figure 1.

In the drawings 1 represents a flexible hose which may be composed of layers of rubber and textile material and which has a very small bore, hose now in use having a bore of only one-eighth of an inch. 2 represents a connector in the form of a sleeve having a threaded portion for engagement with the internal threads of a complementary connector 3. The forward end of the sleeve 2 is provided with an annular projection 4 which, in the assembled fitting, bears against the tapered periphery of the head of the nipple 5. The interior of the sleeve 2 is provided with a number of circumferential grooves 6.

Hose fittings made in accordance with prior practice are indicated in Figure 2, this practice being to insert the hose in the sleeve and then insert a nipple which after insertion was expanded to the form shown in that figure and thus substantial pressure was established on the hose between the nipple and the wall of the sleeve not only forming a tight joint capable of withstanding pressure, but also forcing the rubber of the hose into the grooves in the sleeve and thus establishing means, in addition to friction, to prevent the hose from pulling out of the fitting. It was found, however, that the method employed in making the fitting of Figure 2 was not satisfactory for use with hose of small bore, for the reason that the expanding of the nipple, done progressively from the outer end by passing a tool through the nipple, caused a wave of rubber to be forced ahead of the expanding instrument and to result in a bulge on the walls of the bore beyond the nipple, which decreased the effective diameter of the bore of a small bore hose to a prohibitive degree.

We have discovered that the forming of this bulge can be avoided by not expanding the terminal portion of the nipple to such an extent as to develop very much pressure on the hose between it and the walls of the sleeve and that by following this procedure the remainder of the body of the nipple may be expanded to the extent desired to establish a sufficiently firm sealing pressure on the hose. We are enabled to secure this form of expanded nipple by inserting in the hose after the sleeve has been applied to it the form of nipple shown in Figure 3 and then passing into this nipple the expanding punch shown in Figure 4, which has two expanding portions 8 and 9 of different diameters and so positioned that by not passing the portion 9 entirely through the nipple the end portion is expanded in diameter only slightly, whereas the remaining portion of the nipple is expanded to a sufficient extent to develop the required sealing pressure on the hose. The flow of the hose material under the pressure developed by the expanding of the nipple to the larger diameter increases the pressure on the hose material opposite the terminal portion of the nipple. But, as above indicated, it does not increase this pressure to a point to cause a flow of the material around the end of the nipple.

As previously referred to, the forward end of the sleeve is provided with an annular projection 4 and the head of the nipple 5 is tapered as shown, and the rolling down of the annular projection 4 over the tapered edge of the nipple head after the nipple has been inserted in the hose holds the nipple in position.

The outer face of the head of the nipple is provided with an annular projection 7, which is substantially aligned with the forward end of the sleeve 2, and since the nipple is of copper or other relatively soft material, forms a sealing gasket to bear upon the seat in the complementary coupler member 3 and is capable of distortion to compensate for any misalignment of the faces or axes of the parts of the coupling and thus form a satisfactory seal between the coupling members.

Having fully described my invention, what I claim as new and desire to secure by Letters Patent of the United States is:

1. The method of securing a connector sleeve to a hose of resilient material, which comprises inserting the hose end into the sleeve, inserting a nipple into the bore of the portion of the hose within the sleeve, and then from the outer end inwardly progressively increasing to a substantial degree the diameter of all of the nipple within the hose except that of the inner end portion.

2. The method of securing a connector sleeve having a substantially cylindrical hose receiving recess to a hose of resilient material and of small bore, which comprises inserting the hose end into the recess, inserting a cylindrical expansible nipple into the bore of the portion of the hose in the recess, and then expanding the nipple throughout its length but expanding the inner end portion thereof to a lesser extent than the remainder.

In testimony whereof, we hereunto affix our signatures, this 16th day of April, 1929.

BURNS DICK.
ALBERT BRUNNER.